United States Patent [19]
Draves et al.

[11] Patent Number: 5,835,964
[45] Date of Patent: Nov. 10, 1998

[54] VIRTUAL MEMORY SYSTEM WITH HARDWARE TLB AND UNMAPPED SOFTWARE TLB UPDATED FROM MAPPED TASK ADDRESS MAPS USING UNMAPPED KERNEL ADDRESS MAP

[75] Inventors: Richard P. Draves, Seattle; Gilad Odinak, Redmond, both of Wash.

[73] Assignee: Microsoft Corporation, Redmond, Wash.

[21] Appl. No.: 639,773

[22] Filed: Apr. 29, 1996

[51] Int. Cl.⁶ .................................................. G06F 12/10
[52] U.S. Cl. ........................................................... 711/207
[58] Field of Search ................................. 395/416, 417, 395/418; 711/206, 207, 208

[56] References Cited

PUBLICATIONS

Kavita Bala, M. Frans Kaashoek, and William E. Weihl, "Software Prefetching and Caching for Translation Lookaside Buffers", Proceedings of the First Usenix Symposium on Operating Systems Design and Implementation (Nov., 1994), pp. 243–253.

Rashid et al., *Machine–Independent Virtual Memory Management for Paged Uniprocessor and Multiprocessor Architectures,* Proceedings of the Second International Conference on Architectural Support for Programming Languages and Operating Systems, Oct. 5–8, 1987, pp. 31–39.

*Primary Examiner*—Eddie P. Chan
*Assistant Examiner*—Kevin Verbrugge
*Attorney, Agent, or Firm*—Lee & Hayes, PLLC

[57] ABSTRACT

A virtual memory system includes a hardware-implemented translation lookaside buffer (HTLB) as well as a software-implemented translation lookaside buffer (VTLB). The VTLB is in the system's unmapped memory. The system further includes a plurality of address maps, corresponding to an operating system kernel and to individual tasks executing within the system. The kernel has an address space which includes both mapped and unmapped memory. The address maps corresponding to the individual tasks are stored in the mapped memory of the kernel's address space. The address map corresponding to the kernel itself, however, is stored in the kernel's unmapped memory. HTLB misses are handled by referring to the VTLB. VTLB misses are handled by referring to an appropriate one of the address maps. The code for handling these misses resides in unmapped memory of the kernel's address space. This arrangement prevents recursive TLB misses, without requiring permanent or "wired" VTLB entries. Because there are no permanent VTLB entries, the VTLB can have a simple and efficient structure, and its size can be bounded. As a further feature, the address maps are associated with both spin locks and mutex locks. A routine which modifies an individual address map first acquires the mutex lock associated with the address map and performs initial examination of the address map. Once the routine is ready to make actual modification, it also acquires the spin lock. By having the two types of locks, the majority of the routine can be preemptible. Only the portion of the routine which actually modifies the address map needs to be non-preemptible.

32 Claims, 8 Drawing Sheets

VIRTUAL MEMORY SYSTEM WITH HARDWARE TLB AND UNMAPPED SOFTWARE TLB UPDATED FROM MAPPED TASK ADDRESS MAPS USING UNMAPPED KERNEL ADDRESS MAP

TECHNICAL FIELD

This invention relates to operating systems and to virtual memory management techniques within operating systems.

BACKGROUND OF THE INVENTION

Many modem computer systems run multiple concurrent tasks or processes, each with its own address space. It would be expensive to dedicate a fall complement of memory to each task, especially since many tasks use only a small part of their address spaces. Rather, virtual memory is used to give each process the appearance of a full address space. This allows a program to run on what appears to be a large, contiguous, physical-memory address space, dedicated entirely to the program. In reality, however, the available physical memory in a virtual memory system is shared between multiple programs or processes. The memory that appears to be large and contiguous is actually smaller and fragmented between multiple programs. Each program accesses memory through virtual addresses, which are translated by special hardware or software to physical addresses.

Rather than attempting to maintain a mapping for each possible virtual address, virtual memory systems divide virtual and physical memory into blocks. In many systems, these blocks are fixed in size and referred to as pages. The addresses within an individual page all have identical uppermost bits. Thus, a memory address is the concatenation of a page number, corresponding to the upper bits of the address, and a page offset, corresponding to the lower bits of the address.

A data structure is typically maintained in physical memory to translate from virtual page numbers to physical page frames. This data structure usually takes the form of a page table. A page table is indexed by virtual page number, and it generally has a number of entries equal to the number of pages in the virtual address space.

Virtual-to-physical address translation can consume significant overhead, since every data access requires first accessing the page table to obtain a physical address and then accessing the data itself. To reduce address translation time, computers use a specialized hardware cache dedicated to translations. The cache is referred to as a translation lookaside buffer (TLB). A TLB typically has a small, fixed number of entries. It can be direct-mapped, set associative, or fully associative.

FIG. 1 shows a prior art example of a virtual memory system using a TLB and a page table. A process generates a virtual address 12 comprising a virtual page number and a page offset. The page number portion of the virtual address is used to index a TLB 14. Assuming that the TLB contains an entry corresponding to the virtual page number (a situation referred to as a TLB "hit"), the TLB produces a physical page number. The page offset portion of virtual address 12 is concatenated with the physical page number from the TLB, resulting in a fall physical address for accessing physical memory 16. If the correct entry is not present in TLB 14 (a situation referred to as a TLB "miss"), an initial reference is made to page table 18 to update TLB 14.

A TLB miss thus initiates its own memory reference that could in many cases be the source of another TLB miss, creating the potential for an endless loop. To prevent this, the page table is typically stored in an "unmapped" portion of physical memory that is addressed directly by its physical addresses rather than by virtual addresses.

One disadvantage of this approach is that the page tables can consume large amounts of physical memory. Typically, each program requires its own page table, and each table has entries for every possible virtual page number. The page tables cannot typically be paged to secondary storage.

The requirement of locating the page tables in unmapped memory is a further disadvantage in virtual memory systems such as those described above. It is typically quite difficult or at least very inefficient to deal with dynamically allocated data structures in unmapped memory.

FIG. 2 shows an alternative prior art architecture that is described in Rashid, *Machine-Independent Virtual Memory Management for Paged Uniprocessor and Multiprocessor Architectures,* Proceedings of the Second International Conference on Architectural Support for Programming Languages and Operating Systems, Oct. 5–8, 1987, at 31. This architecture, identified in the article as the Mach architecture, has a microprocessor with a hardware TLB 20 similar or identical to the one described above. A virtual page address 22 is formed by the combination of a virtual page number and a page offset. The virtual page number is translated by TLB 20 into a physical page number and combined with the page offset to address physical memory 24.

The Mach system does not have page tables as they are commonly known. Rather, TLB misses are resolved by a combination of a "pmap" data structure 26 and a plurality of address maps 28. All of these data structures are located in the system's physical memory. Pmap 26 is located in unmapped portions of the physical memory. Address maps 28 are located in mapped portions of physical memory, and are therefore addressed by virtual addresses.

Pmap 26 is somewhat similar to a single page table. In contrast to a typical page table, however, the pmap does not keep track of all valid virtual-to-physical address mappings. Rather, many entries in pmap 26 can be replaced or flushed to make room for newer entries. Accordingly, the pmap can be much smaller than a page table.

Because the pmap does not keep track of all valid virtual-to-physical address mappings, it may not have a specified desired virtual-to-physical translation. If it does not, reference must be made to an appropriate one of the address maps 28. Generally, each process or task has its own address map, which contains a complete description of that task's virtual address space. The Rashid article notes that an address map is a "doubly linked list of address map entries, each of which maps a contiguous range of virtual addresses onto a contiguous area of a memory object."

A system such as shown in FIG. 2 tends to use memory more efficiently than a system such as shown in FIG. 1. One reason for this is that address maps 28 can be structured much more compactly than page tables. While page tables are referenced very often, in response to every TLB miss, address maps 28 are referenced much less frequently, only in response to misses in pmap 26. Therefore, the structure of address maps 28 can sacrifice searching efficiency for compactness. Another advantage of the Mach system is that address maps 28 can be located in mapped memory which is easier to manage and allocate than unmapped memory. In contrast, conventional page tables must usually be located in unmapped memory.

However, some of these advantages are negated by measures that are taken in the Mach system to avoid recursion and deadlock. The possibility of recursion is illustrated in the flow chart of FIG. 3. In response to a TLB miss, reference is made to the pmap in unmapped memory. In the case of a hit, the corresponding physical address is loaded into the TLB from pmap 26, and the miss is resolved without any further activity. In the case of a miss, however, reference is made to an appropriate address map. These steps are illustrated by blocks 30 and 32 of FIG. 3. The search through the address map is performed by kernel routines that are generally located in unmapped memory. However, the address maps are located in mapped memory and accessing them with virtual memory addresses could generate a new TLB miss. A TLB miss on an address map address is illustrated by the curved line from block 32 to block 30. There is a significant chance that the virtual-to-physical address mapping for the address map address will not be present in the pmap, and it will then be necessary to continue back to execution is block 32. This circular execution might continue indefinitely.

To avoid this situation, referred to as recursion, certain entries in pmap 26 of the Mach system are considered permanent or "wired." Specifically, any entry for a kernel address, including entries for address map addresses, are flagged. As shown in FIG. 2, pmap 26 has a column for flagging "wired" entries. Flagged entries are considered permanent and cannot be replaced. This ensures that a second TLB miss as illustrated by the curved line of FIG. 3 will be resolved without further reference to an address map. As noted in the Rashid article:

One of the more unusual characteristics of the Mach dependent/independent interface is that the pmap module need not keep track of all currently valid mappings. Virtual-to-physical mappings may be thrown away at almost any time to improve either space or speed efficiency and new mappings need not always be made immediately but can often be lazy-evaluated.... All of this can be accomplished because all virtual memory information can be reconstructed at fault time from Mach's machine independent data structures. The only major exceptions to the rule that pmap maintains only a cache of available mappings are the kernel mappings themselves. These must always be kept complete and accurate.

Id. at 35–36 (emphasis supplied).

The method of "wiring" pmap entries also solves a recursion problem related to the use of mutexes for synchronizing access to the address maps. A mutex is "lock" that must be obtained by an execution thread before the thread can access an associated data structure. The mutex is requested from and granted by the operating system kernel. If the mutex is not available (for instance if it has already been granted to another thread), the execution thread is suspended until the mutex is available. Without the wired entries described above, address map mutexes of the Mach system would result in an independent source of recursive deadlock in translating virtual addresses.

One of the most significant disadvantage of "wiring" entries in pmap 26 is that it greatly complicates the structure of pmap 26. The pmap cannot be a true cache, in which any entry can be replaced at any time. It is furthermore not possible to bound the size of the pmap. As kernel mappings are added, the size of the pmap must increase. The resulting data structure complexity, and the variable size of the data structure, is a significant disadvantage—especially when the data structure must reside in unmapped memory.

SUMMARY OF THE INVENTION

The system described below reduces the amount of memory consumed by virtual memory translation data structures. This is accomplished by using both a microprocessor's hardware-implemented TLB, a software-implemented TLB in physical memory, and a plurality of address maps. The software-implemented TLB is a true cache--there are no permanent entries. Any entry in the software-implemented TLB can be flushed at any time. The address maps are linked lists, rather than page tables, and are located in mapped memory wherein they consume significantly less space than would conventional page tables. An exception is that the address map used for kernel address mappings is located in unmapped memory. This prevents problems with recursive misses while eliminating the prior art requirement of permanent or "wired" entries in the software-implemented TLB. Access synchronization is accomplished with two different locking mechanisms associated with each address map: a mutex and a spin lock. Preemptible code portions only need to obtain the mutex. However, non-preemptible code portions need to acquire a spin lock before modifying an address map.

DETAILED DESCRIPTION OF A PREFERRED EMBODIMENT

Figure 1:
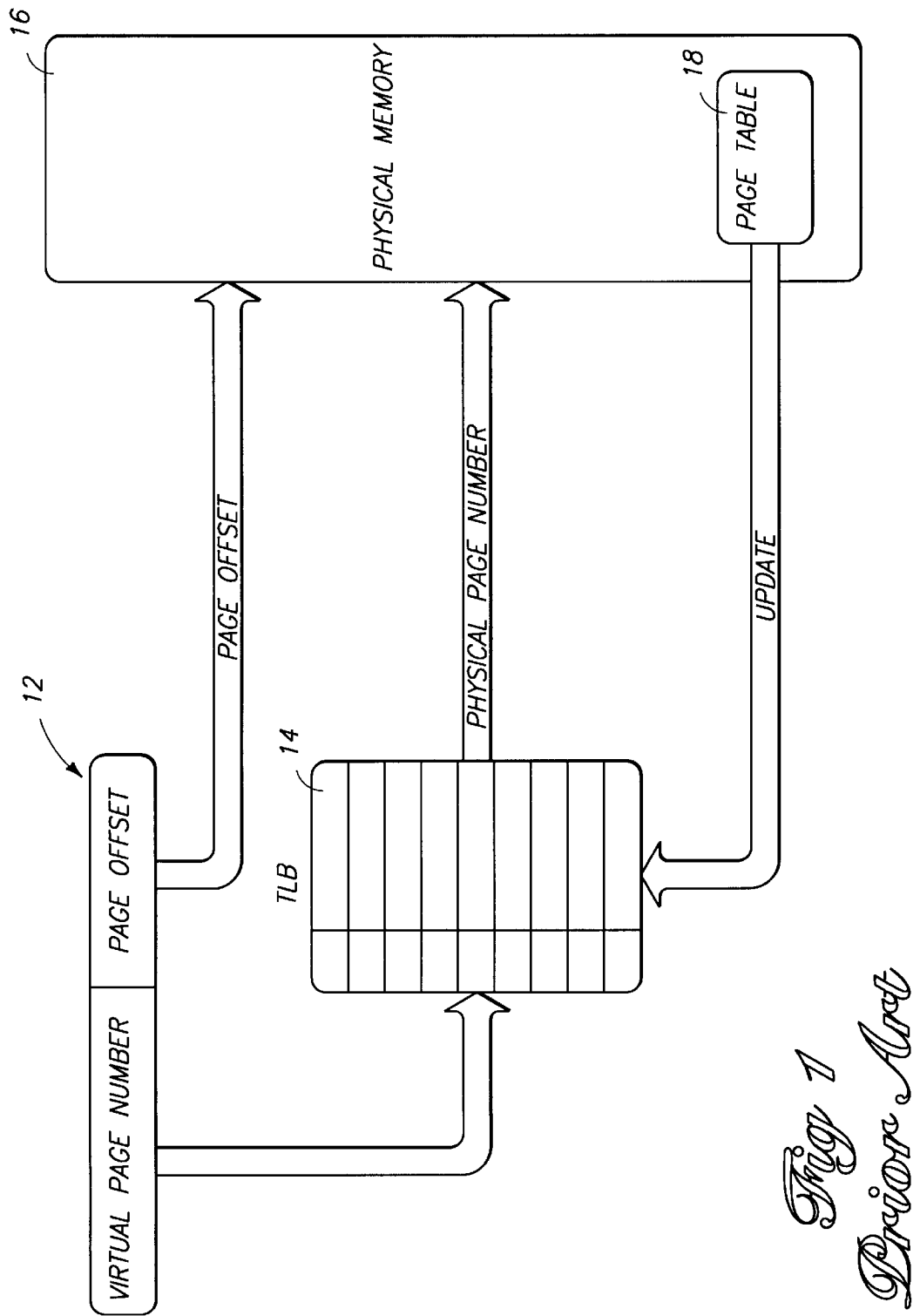
FIG. 1 is a block diagram of a first exemplary virtual memory system in accordance with the prior art.
Figure 2:
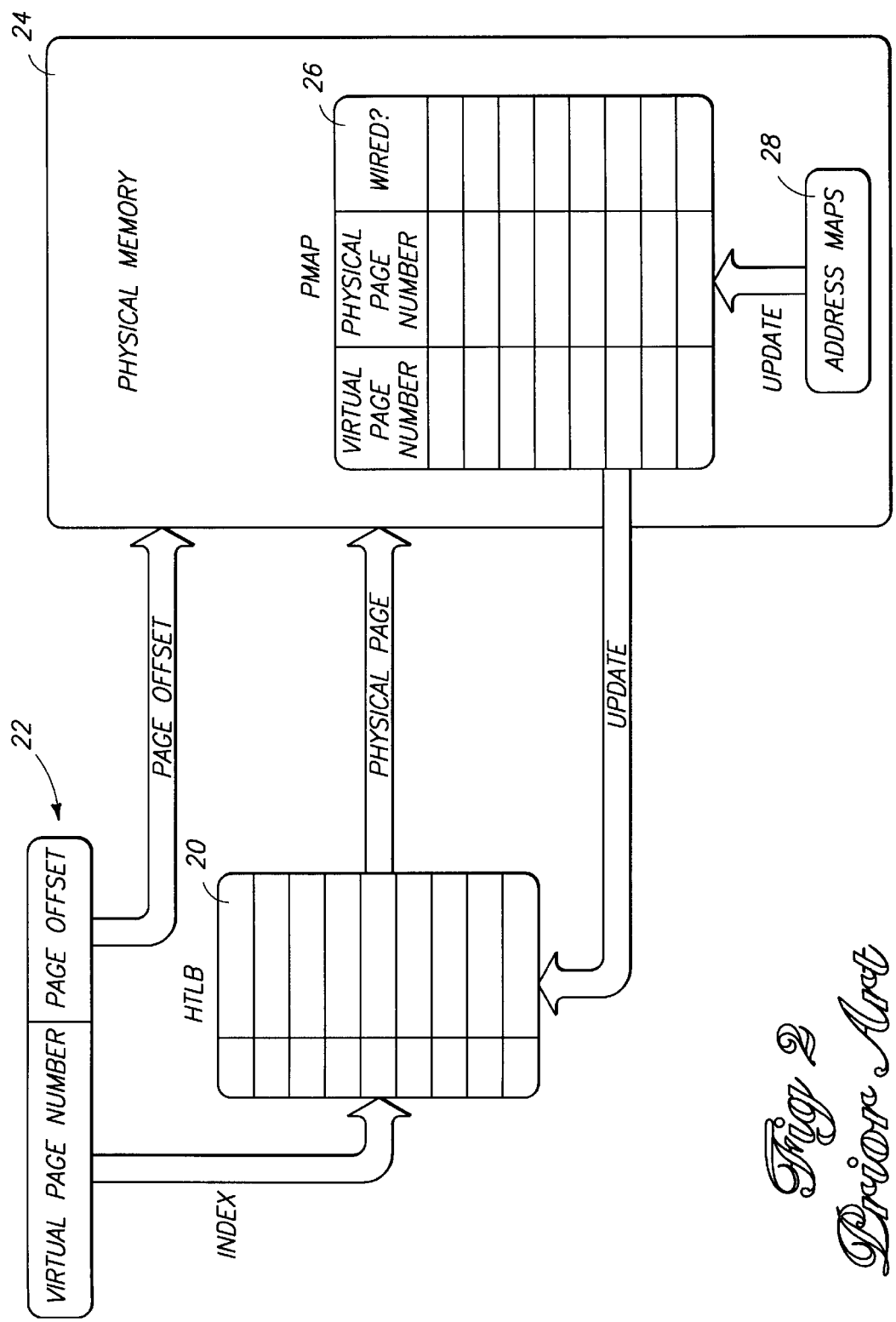
FIG. 2 is a block diagram of a second exemplary virtual memory system in accordance with the prior art.
Figure 3:
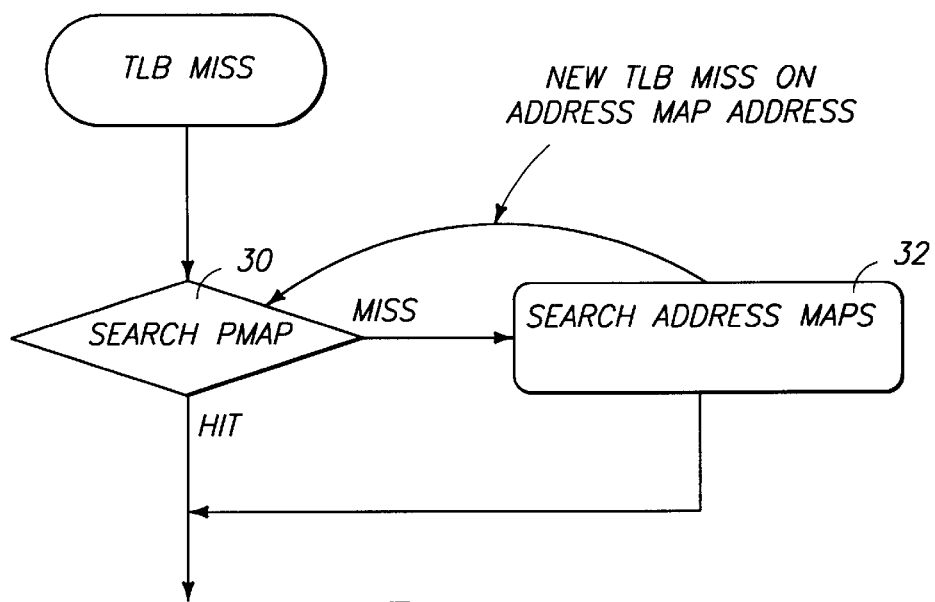
FIG. 3 is a flow chart illustrating the potential for recursion in prior art virtual memory systems.
Figure 4:
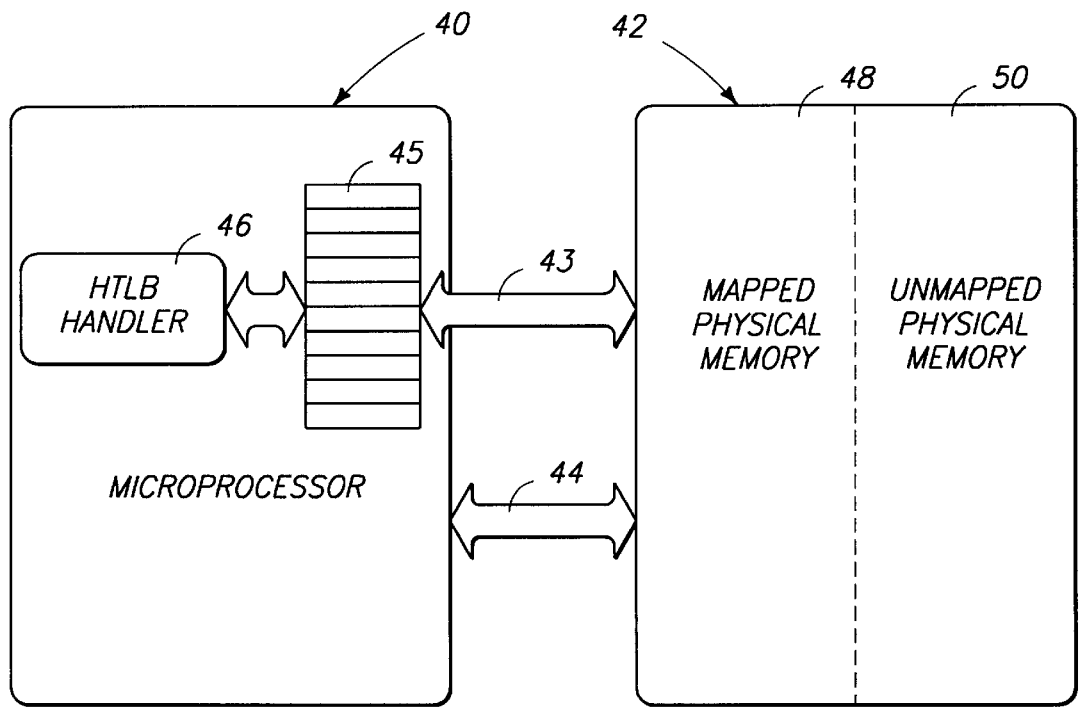
FIG. 4 is a block diagram showing a virtual memory system in accordance with a preferred embodiment of the invention.

FIG. 4 shows hardware components of a virtual memory system in accordance with one preferred embodiment of the invention. The virtual memory system is implemented within a computer system that includes a microprocessor 40 and physical memory 42. Although FIG. 4 shows only a single processor, the system might include a plurality of processors. The virtual memory system is one that is intended to be used by a plurality of different processes or tasks, each having one or more execution threads. The terms task and process as used in this description refer to executing entities within a computer system having their own virtual address spaces.

Physical memory 42 preferably comprises primary memory such as randomly accessible read/write electronic memory (RAM). In a memory paging system, memory 42 might also include secondary storage such as a magnetic hard disk or other data recording media. Physical memory 42 is addressed directly by physical memory addresses through an address bus 43 and a data bus 44. However, many processes executed by microprocessor 40 access memory 42 indirectly, through virtual addresses.

Microprocessor 40 is a conventional, off-the-shelf microprocessor such as a R3000 microprocessor, manufactured by MIPS Technologies of Mountain View, California, or an x86 series microprocessor, manufactured by Intel Corporation of Santa Clara, California. It has internal logic for converting virtual addresses to physical addresses. Specifically, microprocessor 40 is of a type that has an internal, hardware-implemented translation lookaside buffer (HTLB) 45. In prior art computer systems, an HTLB such as this is used in conjunction with page tables to perform virtual-to-physical address translations.

Microprocessor 40 is further of a type that differentiates or that can be configured to differentiate between mapped memory and unmapped memory. Mapped memory is memory that is accessed indirectly with virtual memory addresses through variable virtual-to-physical address mappings. Unmapped memory is memory that is accessed by a fixed, one-to-one mapping to physical memory addresses. Mapped memory is allocated to individual tasks as requested. Unmapped memory is generally used only by limited parts of a computer operating system's kernel. Physical memory 42 is separated into mapped memory 48 and unmapped memory 50.

HTLB 45 stores a fixed number of virtual-to-physical address mappings such as page number to page frame mappings. A lookaside buffer handler 46, also referred to herein as an HTLB handler, updates the HTLB in response to memory address misses. Although HTLB handler 46 is shown within microprocessor 40, it can generally be implemented in the microprocessor itself, as code residing in and executing from physical memory 42, or as combination of both. In the case of the Intel x86 series microprocessor, the HTLB handler is implemented primarily within the microprocessor—when an HTLB miss occurs, the microprocessor refers to a table at a predetermined location within unmapped memory. In the case of the MIPS R3000 microprocessor, the HTLB handler is implemented at least in part by software in unmapped memory 42—when an HTLB miss occurs, the microprocessor jumps to a software procedure at predetermined address within unmapped memory, and the software procedure finds and supplies the desired virtual-to-physical address mapping.

Figure 5:
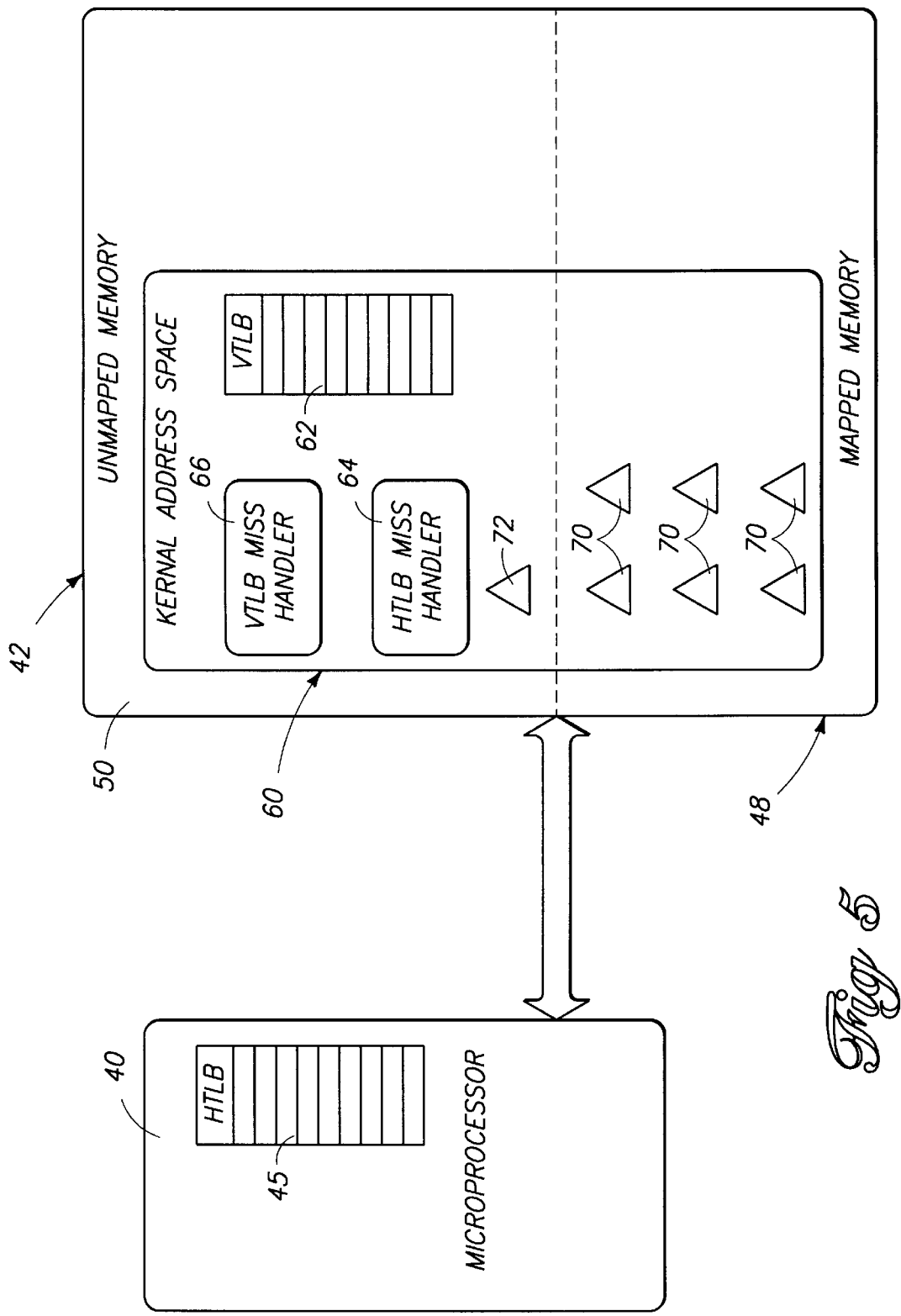
FIG. 5 is a block diagram showing certain aspects of the virtual memory system of FIG. 4 in more detail.

FIG. 5 shows the logical configuration of the preferred virtual memory system in accordance with the invention, including microprocessor 40, mapped memory 48, and unmapped memory 50. The system includes an operating system kernel with an associated address space 60. Kernel address space 60 includes portions of both mapped and unmapped memory.

The system includes a plurality of address maps in memory. A plurality of task address maps 70 reside in the mapped memory of the kernel's address space, while a single kernel address map 72 resides in the unmapped memory of the kernel's address space. Generally, each process or task has its own task address map, which contains a complete description of that task's virtual address space. Each address map is preferably a linked list of map entries, each of which maps a contiguous and variably-sized range of virtual memory addresses onto a contiguous range of physical memory addresses. Thus, each address map describes a set of virtual-to-physical address mappings for a particular task's virtual address space. The address maps can be further organized as binary search trees to facilitate searching.

Kernel address map 72 is similar or identical in structure to task address maps 70. It describes the virtual or mapped address space of the kernel, including the virtual address space within which task address maps 70 reside. Of the address maps, only kernel address map 72 is in unmapped memory.

The illustrated virtual memory system includes, besides HTLB 45 as described above, an address mapping buffer 62 in the unmapped portion of the kernel's address space. In the preferred embodiment described herein, the address mapping buffer is a software-implemented TLB or "virtual" TLB, and is referred to herein as a VTLB. In logical structure, VTLB 62 is like a conventional TLB. However, it is also somewhat unusual in that it is accessed and searched with software instructions rather than with hardwired logic. It has a fixed number of translation entries comprising a dynamically changing subset of the virtual-to-physical address mappings described by the task address maps and the kernel address map. This is in contrast to a normal page table, which contains an entry for each possible virtual page number. In the preferred embodiment, VTLB 62 is implemented as a two-way set associative cache. It is a true cache, in that any single entry can be flushed or replaced as needed. There are no permanent or "hard-wired" entries in VTLB 62.

In the embodiment illustrated by FIG. 5, microprocessor 40 is a MIPS R3000 microprocessor. This microprocessor calls an HTLB "miss handler" 64 to update HTLB 45 in response to HTLB misses. The code of HTLB miss handler 64 is located in the unmapped portion of the kernel's address space. The miss handler refers to VTLB 62 for virtual-to-physical address mapping in response to missed memory addresses, but only when such missed memory addresses are within the range of memory addresses that correspond to mapped memory.

The virtual memory system further includes an address mapping buffer handler 66, also referred to herein as a VTLB handler, which updates VTLB 62 in response to VTLB misses by referring to an appropriate address map 70 or 72. VTLB handler 66 executes from the unmapped memory of the kernel's address space.

HTLB 45 stores a dynamically changing subset of the translation entries from VTLB 62. In the case of an HTLB miss, the HTLB miss handler updates the HTLB by referring to VTLB 62 for the correct virtual-to-physical address mapping. In the case of a VTLB miss, VTLB handler 66 updates the VTLB by referring to the appropriate address map 70 or 72.

Figure 6:
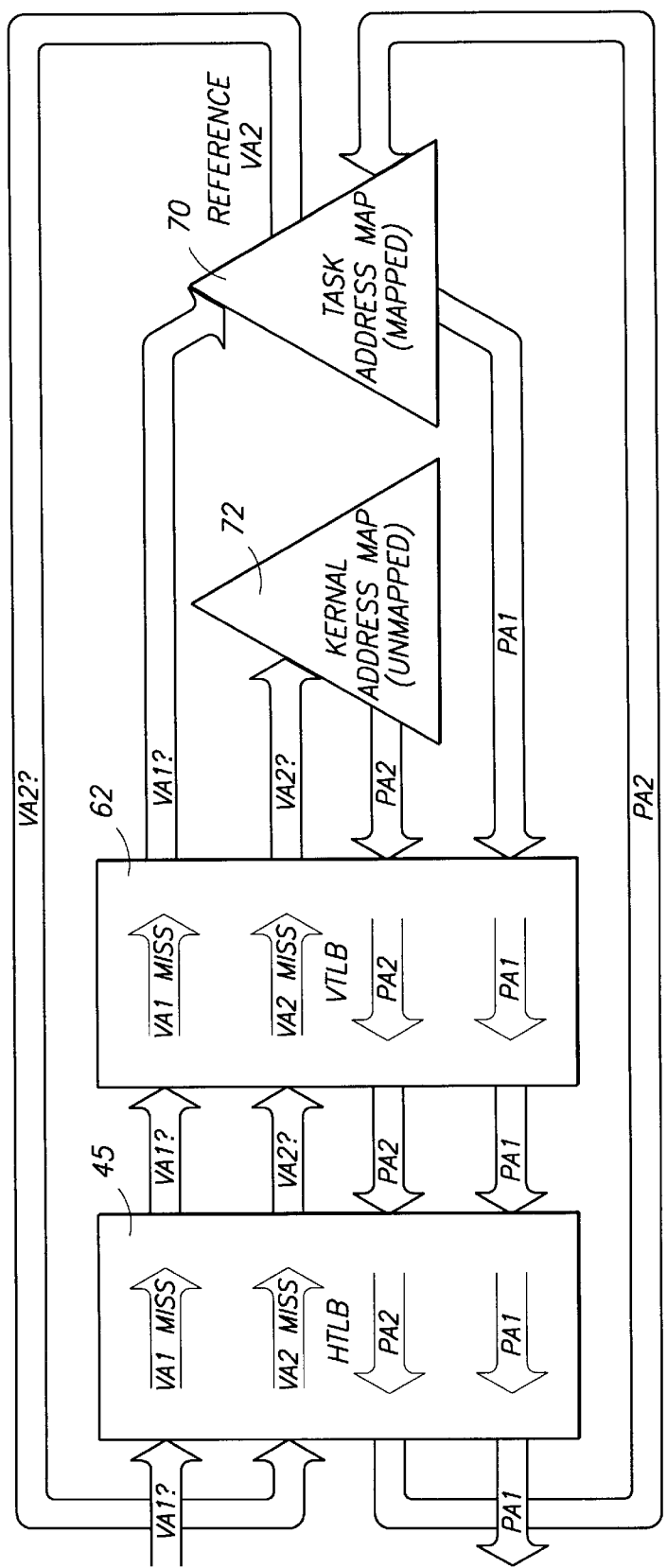
FIG. 6 is a block diagram showing how recursion is limited in the system of FIGS. 4 and 5.

Although there are no permanent entries in VTLB 62, and although user address maps 70 are in mapped portions of the kernel's address space (and can thus cause HTLB and VTLB misses), recursion is limited by the step of locating kernel address map 72 in unmapped memory. This is illustrated in the block diagram of FIG. 6. The diagram shows an initial request for a translation of a virtual address VA1. A miss is generated in the HTLB, and the VTLB is referenced by the HTLB miss handler. There is a miss in the VTLB as well, and the VTLB miss handler code accesses the task address map 70. While searching task address map 70, there are only three possible sources of further misses: code, data, and stack. Neither the HTLB handler nor the VTLB handler executes from mapped memory. Therefore, their code cannot be the source of HTLB or VTLB misses. Furthermore, the HTLB and VTLB miss handlers use a special memory stack in unmapped memory. Therefore, stack accesses cannot be the source of HTLB or VTLB misses. The task address map, however, can be the source of a miss since it is located in mapped memory. Such a scenario is shown as a reference to address map address VA2. In response to a HTLB miss on this address, the VTLB is referenced again, and again there is a miss. This time, however, the VTLB miss handler refers to the kernel address map 72 to translate VA2. Since the kernel address map is in unmapped memory, there can be no further HTLB or VTLB misses. The VTLB miss handler returns physical address PA2 to the HTLB handler, and the second HTLB miss is thereby resolved. The VTLB handler completes its search of task address map 70 for the physical address PA1 corresponding to VA1. The VTLB and the HTLB are updated with PA1 and the first HTLB miss is also resolved.

VTLB 62 can be structured in a variety of ways, and its structure is somewhat dependent on microprocessor architecture. For instance, there is great flexibility in this regard when using the MIPS 3000 microprocessor since a user-supplied software routine is called in response to HTLB misses. In this case, it is advantageous to structure VTLB 62 as a two-way set-associative cache or lookup table having a fixed number of indexed entries. In contrast, the Intel x86 microprocessors perform a hardware lookup in a page table in response to HTLB misses. In this case, the page table is treated as the VTLB. Even with such an architecture, it is possible to limit the number of page table entries and to treat the page table as a cache. Specifically, the page table is limited in accordance with the invention to contain a fixed number of translation or page table entries, wherein the fixed number is much less than the number that would be required to represent all possible virtual or physical addresses within the system. When a desired entry is missing from the page table, the microprocessor interprets this as a page fault and calls a user-supplied routine. The user-supplied routine is, in accordance with the invention, the VTLB miss handler. The VTLB miss handler finds the correct entry (or page table page) from an address map and writes it to the table, replacing the previously existing entry.

Whatever microprocessor architecture is used, it is advantageous to bound or fix the size of VTLB 62. The particular architecture described above allows this because VTLB 62 is void of permanent translation entries. All translation entries in the address mapping buffer are replaceable.

Figure 7:
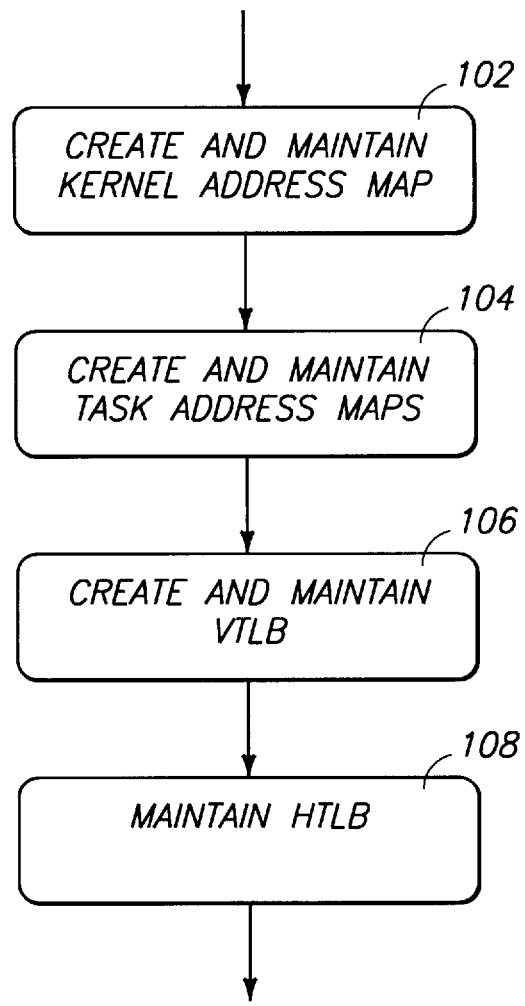
FIG. 7 is a flow chart showing preferred address translation steps in accordance with the invention.

FIG. 7 shows preferred methodical steps in accordance with the invention. Although these steps are shown in a sequential format, they are actually performed in parallel as needed. One step 102 comprises creating and maintaining a kernel address map. The kernel address map describes a set of virtual-to-physical mappings for the operating system kernel's mapped memory. This step includes storing the kernel address map in the unmapped memory of the operating system kernel's address space. The kernel address map is preferably a linked list of mapping entries, each of which is formulated to map an arbitrarily sized virtual address range to a physical address range. The address map can advantageously be configured as a binary search tree to expedite queries. No memory need be consumed for addresses that are not currently mapped.

Another step 104 comprises creating and maintaining task address maps for a plurality of tasks or processes. Each task address map describes a set of virtual-to-physical mappings for a task's virtual memory space. This step includes storing the task address maps in the mapped memory of the operating system kernel's address space, where it is accessed through virtual memory addresses. The task address maps are organized and structured just like the kernel address map.

A step 106 comprises storing a fixed-size address mapping buffer or VTLB in the unmapped memory of the operating system kernel, and maintaining a fixed number of translation entries therein. The translation entries comprise a dynamically changing subset of the virtual-to-physical address mappings described by the task address map and the kernel address map. The VTLB is preferably configured as a set associative lookup table, although it can also be configured as a lookup table with a limited number of page table entries to accommodate specific microprocessor architectures. The VTLB is configured as a true cache, with no permanent entries. All entries are designated as being replaceable at all times.

The preferred steps of the invention further include a step 108 of maintaining a dynamically changing subset of the translation entries from the VTLB in a hardware-implemented TLB (HTLB). As discussed above, the HTLB is accessed to translate memory addresses that fall within a range of addresses corresponding to mapped memory. The HTLB is not used to translate addresses that fall within a range of addresses corresponding to unmapped memory.

Figure 8:
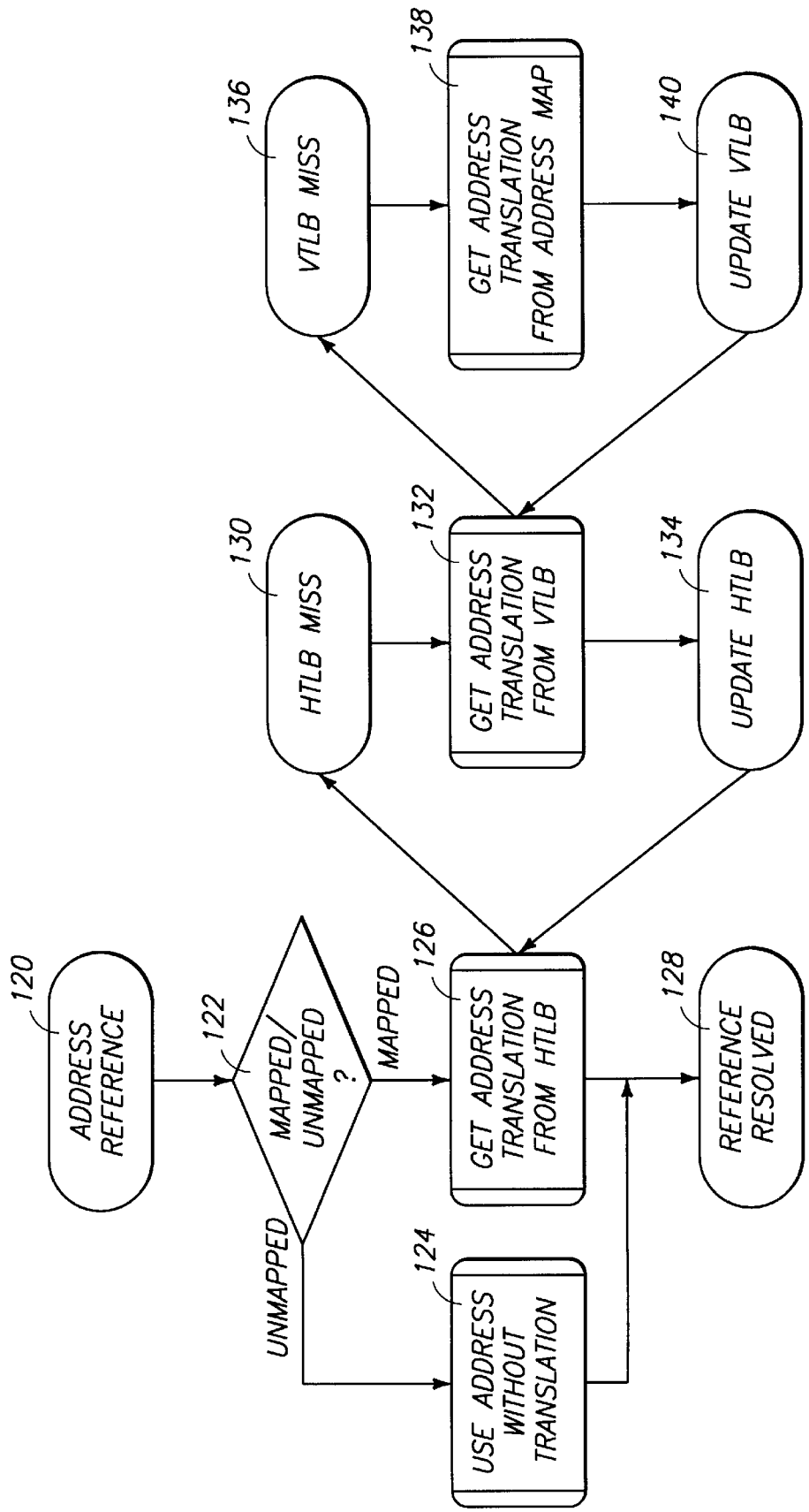
FIG. 8 is a flow chart showing further preferred address translation steps in accordance with the invention.

FIG. 8 shows further steps in accordance with the invention. The steps shown in FIG. 8 relate primarily to address translation once the various tables have been created. As indicated by block 120, the process illustrated by FIG. 8 begins with a reference to a specific address. Initially, in step 122, the microprocessor performs a range check to determine whether the address falls within the range of addresses corresponding to unmapped memory. If it does, the address is used as a physical address without fuirther translation, as indicated by block 124. Alternatively, there might be some simple derivation or translation performed on the address, as long as such derivation or translation does not require referencing mapped memory. Preferably, such a translation would be a predetermined mathematical function that could be carried out without any reference to external data and even more preferably with no reference to physical memory.

If the address instead falls within a range of addresses corresponding to mapped memory, reference is made to the HTLB, as shown in block 126, for a corresponding translation entry. If the corresponding entry is found in the HTLB, it is used to translate the specified address and no further activity is required. Otherwise, the microprocessor or an HTLB misses handler performs a step of referencing the VTLB to update the HTLB. As illustrated, however, this is done only in response to missed memory addresses corresponding to mapped memory of the system.

Blocks 130, 132, and 134 illustrate the step of referencing the VTLB. If an entry corresponding to the specified addresses is found in the VTLB, the entry is used to update the HTLB. Otherwise, a VTLB miss handler is invoked as illustrated by blocks 136, 138, and 140 of FIG. 8. The VTLB miss handler updates the VTLB in response to missed memory addresses by referencing an appropriate one of the task and kernel address maps.

Note that the HTLB miss handler, the VTLB miss handler, and the kernel address map are all located in unmapped memory of the kernel's address space so that they cannot be the source of any HTLB or VTLB misses. In addition, a further preferred step includes switching to a special memory stack during execution of the HTLB and VTLB miss handlers. This special memory stack is located in unmapped memory of the kernel's address space so that accessing the stack cannot cause HTLB or VTLB misses.

The preferred embodiment of the invention includes a further feature relating to preemptibility. In an operating system designed for real-time control applications, preemptibility is an important issue. Specifically, it is very important to limit the portions of operating system kernel code that are non-preemptible. Nonetheless, some portions of kernel code must be non-preemptible. For instance, those portions of kernel code that perform context switches are necessarily non-preemptible.

It is also required to synchronize access to database structures within an operating system such as the task and kernel address maps described above. This is required to ensure that processes access the address maps in a mutually exclusive manner. Within a single-processor system, this can be done by disabling preemption during sections of code that access the address maps. In a multi-processor system, however, it is necessary to use an additional mechanism. Conventionally, this mechanism has been a "spin lock." Before accessing a data structure associated with a spin lock, a process must "obtain" the spin lock. If the spin lock is not free (for instance if it has been given to another process), the kernel (and thus, the processor) is held in limbo, "spinning," until it gets the lock. To prevent potential deadlock, portions of code which "spin" in this manner must be non-preemptible. However, in the virtual memory system described above there are many code segments that access the address maps. These code segments are potentially quite long. Such long segments, if they were required to be non-preemptible, would degrade performance in systems in which real-time response was critical.

This outcome is avoided in the preferred embodiment of the invention by using a two-level locking scheme involving both spin locks and mutexes. A spin lock, as mentioned above, is a permission that must be obtained before accessing a data structure. After requesting a spin lock, the requesting process simply loops until the spin lock is granted. A mutex is a higher level locking scheme. A mutex lock is a permission requested by a process from a supervisory process such as an operating system. Rather than looping while waiting for the permission, the requesting process passes its execution thread to the supervisory process. The execution thread returns to the requesting process only when the mutex has been granted. Requesting a mutex is potentially blocking, in that there can be an indefinite wait for control to return to the requesting process. Accordingly, mutex locking is not appropriate for non-preemptible code.

Figure 9:
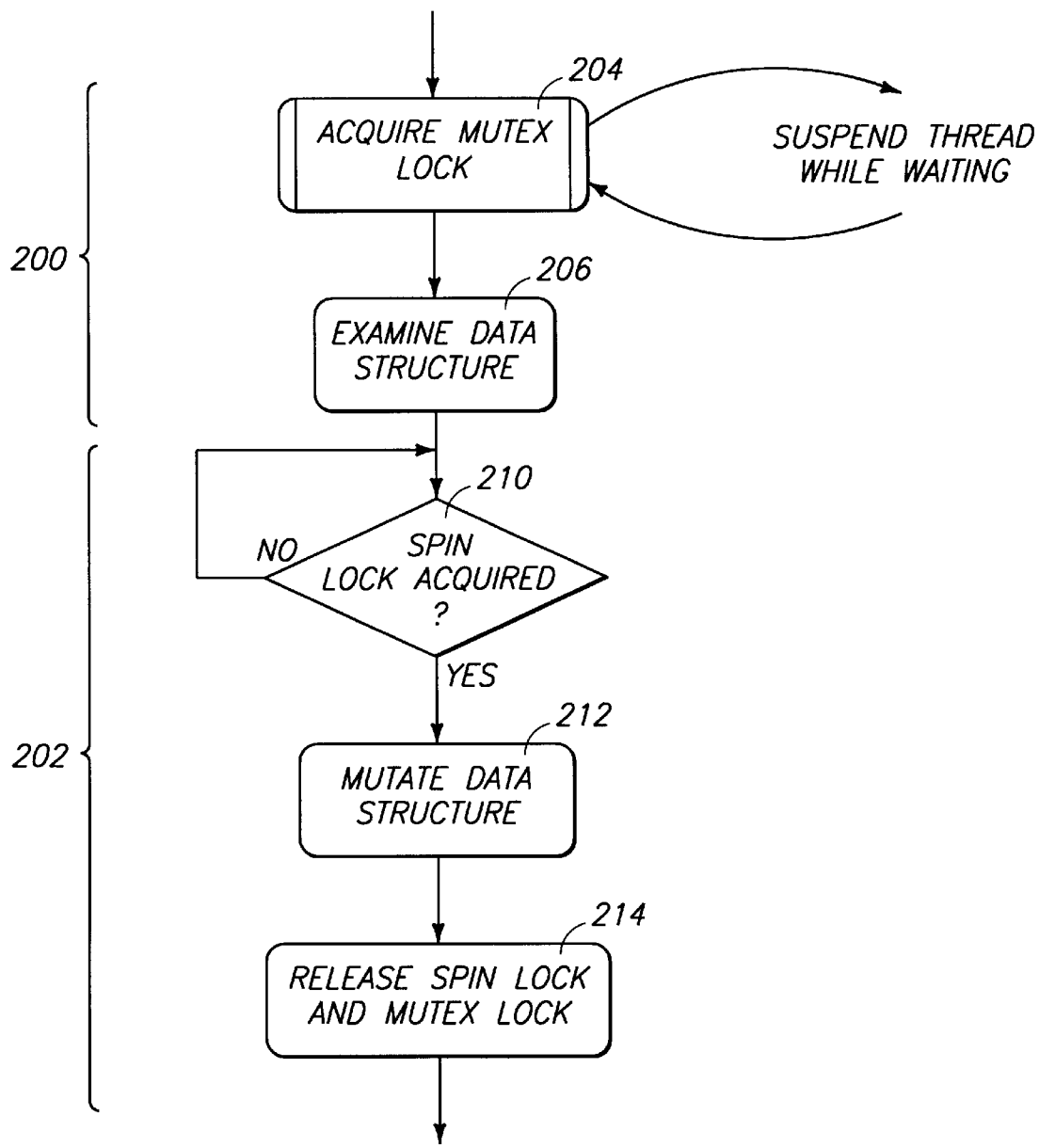
FIG. 9 is a flow chart showing preferred address map synchronization steps in accordance with the invention.

The operating system kernel of the preferred embodiment includes a virtual memory manager having an address map database modification procedure as shown in FIG. 9. When modifying an address map for memory management purposes, various examinations and calculations are typically performed before any actual mutation of the address map data structure. For example, allocation and deallocation of address map nodes are typically performed before mutating the address map data structure. While these examinations can be relatively lengthy, it has been observed that the code sections that actually mutate or change the data structures are quite quick. Preferred methodical steps in accordance with the invention thus include classifying address map modification portions of the virtual memory manager code into sections that are referred to herein as unbounded sections and bounded sections, labeled 200 and 202, respectively, in FIG. 9. Unbounded section 200 examines but does not mutate the address maps. Subsequent bounded section 202 mutates or changes the data structure of the address map based on the previous examination of the data structure by unbounded section 200. The invention further includes designating the unbounded code sections of the database modification procedure as preemptible, and designating the bounded code sections as non-preemptible.

In the preferred embodiment of the invention, each of the kernel and task address maps is associated with both a mutex lock and a spin lock. Preemptible code sections are configured to acquire only the mutex lock before accessing an address map. The non-preemptible code sections, however, are configured to also acquire the spin lock before accessing the address map.

With reference to FIG. 9, acquiring the mutex lock associated with an address map is shown by execution block 204. This step is performed before any access of an address map data structure. Step 204 is in an unbounded section of the database modification procedure and is therefore preemptible. As illustrated, acquiring the mutex lock includes suspending the execution thread of the database modification procedure while waiting for the mutex lock to become available.

After acquiring the mutex lock, the database modification procedure performs a step 206 of examining the address map data structure. Because the database modification procedure holds the mutex, this examination is performed to the exclusion of all other processes. Once any required examination of database structures has been completed, the procedure enters a bounded and non-preemptible portion of its code, beginning with block 210 which indicates a step of acquiring the spin lock associated with the address map. A code section is typically made non-preemptible by calling an operating system function. Process execution loops through block 210 until the spin lock is acquired.

Once the spin lock is acquired, the database modification procedure becomes non-preemptible, switches to the special stack in unmapped memory, and performs the actual mutation of the data structure in execution block 212. It then releases both the spin lock and the mutex lock in block 216, becomes preemptible again, and switches back to its normal stack. If further examination and mutations are to be performed, the database modification procedure might release only the spin lock, retain the mutex lock during further examinations, and re-acquire the spin lock just before further database mutations. However, both the mutex and the spin lock must be acquired before implementing any actual changes on the address map.

The VTLB miss handler is implemented as non-preemptible code. To access a particular address map, the VTLB miss handler first acquires the associated spin lock, but is not required to acquire the mutex lock. Because of this, VTLB misses against an address map can be handled during potentially lengthy address map manipulations—it is only during the bounded mutation sections of the manipulations, during which the spin lock is required by address map modification procedures, that the VTLB miss handler must wait. This prevents deadlock problems on the kernel address map—if a kernel VTLB miss occurs while the kernel address map is being manipulated, it can be resolved. The mutation code that acquires the spin lock is non-preemptible and uses a special stack in unmapped memory. Because of this, VTLB misses will not occur during the mutation code.

The system and method described above allow much more efficient use of memory than has previously been possible in virtual memory systems. This is accomplished by the architecture set forth above, which allows relatively compact data structures for storing virtual-to-physical address mappings. This advantage is accomplished without any significant degradation of memory access speed. The invention also provides greater preemptibility than prior art systems. In the past, most portions of memory management routines had to be non-preemptible to allow synchronization of access. The configuration described above, on the other hand, allows the majority of memory management routines to be preemptible.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A virtual memory system to be used by a plurality of tasks, each task having an associated virtual address space, the virtual memory system comprising:

physical memory having physical memory addresses, the physical memory being separated into (a) mapped memory which is accessed with virtual memory addresses through variable virtual-to-physical address mappings and (b) unmapped memory;

an operating system kernel having an associated address space that includes both mapped and unmapped memory;

a plurality of task address maps stored in the mapped memory of the kernel's address space, each task address map describing a set of virtual-to-physical address mappings for a particular task's virtual address space;

a kernel address map stored in the unmapped memory of the kernel's address space, the kernel address map describing a set of virtual-to-physical address mappings for the mapped memory of the kernel's address space;

an address mapping buffer in the unmapped memory, the address mapping buffer having a fixed number of translation entries comprising a dynamically changing subset of the virtual-to-physical address mappings described by the task address maps and the kernel address map;

a hardware-implemented translation lookaside buffer which stores a dynamically changing subset of the translation entries from the address mapping buffer;

a lookaside buffer handler which updates the hardware-implemented translation lookaside buffer from the address mapping buffer in response to mapped memory address misses;

an address mapping buffer handler which updates the address mapping buffer in response to misses by referring to one of the task and kernel address maps.

2. A virtual memory system as recited in claim 1 wherein the address mapping buffer is a lookup table.

3. A virtual memory system as recited in claim 1 wherein the address mapping buffer is a page table of a bounded and limited size, wherein any individual entry of the page table can be replaced.

4. A virtual memory system as recited in claim 1 wherein the address mapping buffer is a set associative lookup table.

5. A virtual memory system as recited in claim 1 wherein the address mapping buffer is a set associative lookup table and wherein there are no permanent entries in the set associative lookup table.

6. A virtual memory system as recited in claim 1 wherein all translation entries in the address mapping buffer are replaceable.

7. A virtual memory system as recited in claim 1 wherein the address mapping buffer is void of permanent translation entries.

8. A virtual memory system as recited in claim 1 wherein the address mapping buffer handler executes from the unmapped memory of the kernel's address space.

9. A virtual memory system as recited in claim 1 wherein neither the lookaside buffer handler nor the address mapping buffer handler execute from mapped memory.

10. A virtual memory system as recited in claim 1 wherein the address maps are organized as binary search trees.

11. A virtual memory system as recited in claim 1 wherein the address maps are organized as linked lists.

12. A virtual memory system as recited in claim 1 wherein the address maps comprise, respectively, a plurality of map entries, each of said entries mapping a contiguous and variably-sized range of virtual memory addresses onto a contiguous range of physical memory addresses.

13. A virtual memory system as recited in claim 1 wherein the address maps comprise, respectively, a plurality of linked map entries, each of said entries mapping a contiguous and variably-sized range of virtual memory addresses onto a contiguous range of physical memory addresses.

14. A virtual memory system as recited in claim 1 and further comprising:

a virtual memory manager having preemptible code portions and non-preemptible code portions, the kernel and task address maps being accessible by both the preemptible and non-preemptible code portions of the virtual memory manager;

a spin lock and a mutex lock associated with the each of the task and kernel address maps;

wherein the preemptible code portions of the virtual memory manager are configured to acquire only the mutex lock of a particular address map before accessing said address map; and wherein the non-preemptible code portions of the virtual memory manager are configured to acquire the spin lock of the particular address map before accessing said address map.

15. A virtual memory system as recited in claim 14 wherein the address mapping buffer handler is configured to acquire the spin lock of the particular address map before accessing said address map.

16. A virtual memory system as recited in claim 14, wherein the virtual memory manager comprises bounded sections which mutate the address maps and unbounded sections which do not mutate the address maps, wherein the bounded sections of the virtual memory manager are non-preemptible and the unbounded sections of the virtual memory manager are preemptible.

17. An operating system kernel as recited in claim 14 wherein the virtual memory manager has an address map modification procedure, the address map modification procedure having a preliminary unbounded section which examines but does not mutate the particular address map and a subsequent bounded section which mutates said particular address map based on the previous examination of said particular address map by the unbounded section;

wherein the bounded section of the virtual memory manager is non-preemptible and the unbounded section of the virtual memory manager is preemptible; and wherein the bounded section of the address map modification procedure is configured to acquire the spin lock and the mutex lock associated with said particular address map before mutating said particular address map.

18. A virtual memory system to be used by a plurality of tasks, each task having an associated virtual address space, the virtual memory system comprising:

physical memory having physical memory addresses, the physical memory being separated into (a) mapped memory which is accessed with virtual memory addresses through variable virtual-to-physical address mappings and (b) unmapped memory;

an operating system kernel having an associated address space that includes both mapped and unmapped memory;

a plurality of task address maps stored in the mapped memory of the kernel's address space, each task address map describing a set of virtual-to-physical address mappings for a particular task's virtual address space;

a kernel address map stored in the unmapped memory of the kernel's address space, the kernel address map describing a set of virtual-to-physical address mappings for the mapped memory of the kernel's address space;

wherein the address maps comprise, respectively, a plurality of map entries, each of said entries mapping a contiguous range of virtual memory addresses onto a contiguous range of physical memory addresses;

an address mapping buffer in the unmapped memory, the address mapping buffer comprising a set-associative lookup table having a fixed number of translation entries, said translation entries comprising a dynamically changing subset of the virtual-to-physical address mappings described by the task address maps and the kernel address map, wherein all translation entries in the address mapping buffer are replaceable;

a hardware-implemented translation lookaside buffer which stores a dynamically changing subset of the translation entries from the address mapping buffer;

a lookaside buffer handler which updates the hardware-implemented translation lookaside buffer from the address mapping buffer in response to mapped memory address misses;

an address mapping buffer handler which executes from unmapped memory, the address mapping buffer updating the address mapping buffer in response to missed memory addresses by referring to one of the address maps.

19. A virtual memory system as recited in claim 18 wherein the address maps are organized as binary search trees.

20. A virtual memory system as recited in claim 18 wherein the address maps are organized as linked lists.

21. A method of addressing physical memory in a virtual memory system used by a plurality of tasks, each task having an associated virtual address space, wherein the physical memory of the virtual memory system has physical memory addresses, the physical memory being separated into (a) mapped memory which is accessed with virtual memory addresses through variable virtual-to-physical address mappings and (b) unmapped memory, the virtual memory system including an operating system kernel having an associated address space that includes both mapped and unmapped memory, the method comprising the following steps:

describing a set of virtual-to-physical address mappings for each task's virtual address space in a corresponding task address map;

describing a set of virtual-to-physical address mappings for the operating system kernel's mapped memory in a corresponding kernel address map;

storing the task address maps in the mapped memory of the operating system kernel's address space;

storing the kernel address map in the unmapped memory of the operating system kernel's address space;

storing a fixed-size address mapping buffer in the unmapped memory;

maintaining a fixed number of translation entries in the address mapping buffer, said fixed number of translation entries comprising a dynamically changing subset of the virtual-to-physical address mappings described by the task address maps and the kernel address map;

maintaining a dynamically changing subset of the translation entries from the address mapping buffer in a hardware-implemented translation lookaside buffer;

referencing the address mapping buffer to update the hardware-implemented translation lookaside buffer only in response to missed memory addresses corresponding to mapped memory of the virtual memory system;

updating the address mapping buffer in response to missed memory addresses by referencing one of the task and kernel address maps.

22. A method as recited in claim 21 and further comprising a step of configuring the address mapping buffer as a set associative lookup table.

23. A method as recited in claim 21 and fuirther comprising a step of designating all translation entries in the address mapping buffer as replaceable translation entries.

24. A method as recited in claim 21 and further comprising a step of switching to a special memory stack in unmapped memory when referencing the address mapping buffer and when referencing the task and kernel address maps.

25. A method as recited in claim 21 and fuirther comprising a step of organizing the task and kernel address maps as binary search trees.

26. A method as recited in claim 21 and further comprising a step of organizing the task and kernel address maps as linked lists.

27. A method as recited in claim 21 and further comprising a step of formulating a plurality of map entries for each kernel and task address map, each of said entries mapping a contiguous and variably-sized range of virtual memory addresses onto a contiguous range of physical memory addresses.

28. A method as recited in claim 21 and further comprising a step of formulating a plurality of linked map entries for each kernel and task address map, each of said entries mapping a contiguous and variably-sized range of virtual memory addresses onto a contiguous range of physical memory addresses.

29. A method as recited in claim 21, wherein the operating system kernel has preemptible and non-preemptible code portions, the method further comprising:

associating both a spin lock and a mutex lock with the task and kernel address maps, respectively;

in the preemptible code portions of the operating system kernel, acquiring only the mutex lock of a particular address map before accessing said particular address map; and in the non-preemptible code portions of the operating system kernel, acquiring the spin lock of the particular address map before accessing said particular address map.

30. A method as recited in claim 29 and further acquiring only the spin lock of the particular address map before updating the address mapping buffer from the particular address map.

31. A method as recited in claim 29 and fuirther comprising the following steps:

classifying the operating system kernel as bounded sections which mutate the task and kernel address maps and unbounded sections which do not mutate the task and kernel address maps;

designating the bounded sections of the operating system kernel as non-preemptible; and designating the unbounded section of the operating system kernel as preemptible.

32. A method as recited in claim 29 and further comprising the following steps:

examining the particular address map without mutating it in an unbounded section of the operating system kernel;

after examining the particular address map, mutating it in a bounded section of the operating system kernel based on the examining step;

designating the bounded section of the operating system kernel as non-preemptible;

designating the unbounded sections of the operating system kernel as preemptible;

acquiring both the spin lock and the mutex lock of the particular address map before mutating it in the bounded section of the virtual memory manager.

* * * * *